Patented May 12, 1953

2,638,484

UNITED STATES PATENT OFFICE 2,638,484

PREPARATION OF AN OCTENONE

Walter Kimel, Highland Park, N. J., assignor to Hoffmann-La Roche Inc., Nutley, N. J., a corporation of New Jersey No Drawing. Original application June 5, 1951, Serial No. 230,075. Divided and this application February 14, 1952, Serial No. 271,644

2 Claims. (Cl. 260—595)

This invention relates to a novel chemical compound, and to processes of preparing and converting said compound. More particularly, the invention is concerned with the new substance t-vinylisopropyl acetoacetate, which can also be designated 1,1-dimethyl-propen-2-yl 3-oxobutanoate, and which can be represented by the formula $CH_3COCH_2COO \cdot C(CH_3)_2CH=CH_2$. This substance can be prepared by condensing 2-methyl-buten-3-ol-2 with diketene, and the product can be converted by heating (with loss of carbon dioxide) into 2-methyl-hepten-2-one-6. The latter can be converted to citral, geraniol or pseudoionone by known processes, and thus the invention is of interest to the pharmaceutical, perfume and soap industries.

The invention is further disclosed in the following example, which is illustrative but not limitative thereof.

Example

In a flask equipped with a stirrer, a thermometer, a dropping funnel and a drying tube, 0.3 g. of sodium was reacted with 86 g. (1.0 mol) of 2-methyl-buten-3-ol-2. The solution was cooled to 0° C. and 101 g. (1.2 mols) of diketene was added slowly, with efficient stirring, during one hour, while maintaining the temperature at 0° C. The mixture was then allowed to stand for 24 hours at 0° C.

The resulting dark orange solution was diluted with 200 cc. of ether and extracted three times with 150 cc. portions of saturated sodium bicarbonate solution, and then washed with water until neutral. The organic solution was dried over calcium sulphate, and concentrated in vacuo. The residue was fractionated under reduced pressure to yield t-vinylisopropyl acetoacetate, B. P. (8 mm.) 84°–86° C.; $n_D^{25}=1.4364$.

39.0 g. (0.229 mol) of t-vinylisopropyl acetoacetate was placed in a flask equipped with a reflux condenser, a thermometer, and a fine capillary tube for the introduction of nitrogen. A slow stream of nitrogen was introduced and the ester was heated at a very gentle reflux for about 1⅔ hours at which time the evolution of carbon dioxide had ceased. The residue in the flask was fractionated under reduced pressure to yield 2-methyl-hepten-2-one-6, B. P. (35 mm.) 83°–85° C.; $n_D^{25}=1.4369$. The latter product was further identified by conversion to its semicarbazone, M. P. 134.5°–135.5° C., and by conversion to its 2,4-dinitrophenylhydrazone, M. P. 86.3° C.

This application is a division of my copending application Serial No. 230,075, filed June 5, 1951.

I claim:

1. A process which comprises condensing diketene with 2-methyl-buten-3-ol-2 and decarboxylating the condensation product to produce 2-methyl-hepten-2-one-6.

2. A process of preparing 2-methyl-hepten-2-one-6 which comprises heating t-vinylisopropyl acetoacetate to eliminate carbon dioxide therefrom.

WALTER KIMEL.

No references cited.